United States Patent [19]
Santhanam

[11] Patent Number: 6,151,705
[45] Date of Patent: Nov. 21, 2000

[54] EFFICIENT USE OF THE BASE REGISTER AUTO-INCREMENT FEATURE OF MEMORY ACCESS INSTRUCTIONS

[75] Inventor: Vatsa Santhanam, Campbell, Calif.

[73] Assignee: Hewlett-Packard Company, Palo Alto, Calif.

[21] Appl. No.: 08/960,848

[22] Filed: Oct. 30, 1997

[51] Int. Cl.[7] .................................................. G06F 12/04
[52] U.S. Cl. .................................................. 717/9; 717/5
[58] Field of Search ................................. 395/705, 709; 717/5, 9

[56] References Cited

U.S. PATENT DOCUMENTS

| | | | |
|---|---|---|---|
| 5,167,026 | 11/1992 | Murray et al. | 395/375 |
| 5,475,856 | 12/1995 | Kogge | 395/800 |
| 5,699,544 | 12/1997 | Robbins et al. | 395/421.02 |
| 5,860,130 | 1/1999 | Yamanaka et al. | 711/169 |

OTHER PUBLICATIONS

Greenberg. IBM Offers Sneak Peek at RISC Work—Some Details On Chip Emerge At IEEE Technical Symposium. Unix Today. n 034, 32, Nov. 1989.

C.B. Hall, et al., Performance Characteristics of Architectural Features of the IBM RISC System/600, 1991 ACM 0–89791–380–9/91/0003–0303, pp. 303–309.

Vatsa Santhanam, Register Reassociation in PA–RISC Compilers, Jun. 1992 Hewlett–Packard Journal, pp. 33–38.

Peter Markstein, et al., Chapter 9, Strength Reduction, Dec. 28, 1992, from Optimization in Compilers, ACM press, pp. 1–40, & 101–102.

Kevin Harris, et al., Chapter 16, VAX Fortran, Dec. 28, 1992, from from Optimization in Compilers, ACM press, pp. 1–43, & 101–102.

Richard L. Sites, Compilation of Loop Induction Expressions, 1977, vol. 1, ACM Transactions on Programming Languages & Systems, pp. 50–57.

Kevin O'Brien, et al., Advanced Compiler Technology for the RISC System/6000 Architecture, 1990, IBM RISC System/6000 Technology, pp. 154–161.

*Primary Examiner*—Reba I. Elmore
*Assistant Examiner*—Robert Crockett
*Attorney, Agent, or Firm*—Denise A. Lee

[57] ABSTRACT

The present invention is a compiler optimization algorithm that reduces address computation overhead for architectures that support an auto-increment addressing mode for memory access instructions. The compiler algorithm identifies opportunities for auto-increment synthesis in a low level intermediate representation. Candidate loads and stores are transformed to use a base+displacement addressing mode (even if a base+displacement addressing mode is not supported in the target architecture) prior to instruction scheduling. After instruction scheduling, the pseudo (base+displacement) instructions are transformed back into memory operations that increment their base register operands to set up effective memory addresses.

23 Claims, 21 Drawing Sheets

EXAMPLE 1    LD, MA    4 ( R 10 ), R 11

EXAMPLE 2    ST, MB    R8, - 4 ( R 9 )

FIG. 1

(PRIOR ART)

```
int    A [ 10 ] ;
int    g, h, k, l;
foo    ( )
{
       int  i ;
       for (i = 1; i < 8 ; i + +)
       {
              g = A [ i + 1 ] ;
              A [ i ] = h ;
              K = A [ i + 2 ] ;
              A [ i - 1 ] = l;
       }
}
```

FIG. 3A (PRIOR ART)

| | | |
|---|---|---|
| 1 | LOAD | A [ i + 1 ] |
| 2 | STORE | A [ i ] |
| 3 | LOAD | A [ i + 2 ] |
| 4 | STORE | A [ i - 1 ] |

| | | |
|---|---|---|
| 1 | LOAD, MA | $4 (R_w), R_g$ |
| 2 | STORE, MA | $R_h, 4 (R_x)$ |
| 3 | LOAD, MA | $4 (R_y), R_k$ |
| 4 | STORE, MA | $R_l, 4 (R_z)$ |

3   LOAD, MA    4 ($R_y$), $R_k$

1   LOAD, MA    4($R_w$), $R_g$

4   STORE, MA   $R_l$, 4 ($R_z$)

2   STORE, MA   $R_h$, 4 ($R_x$)

1   LOAD, MA    -4 ($R_p$), $R_g$

2   STORE, MA   $R_h$, + 8 ($R_p$)

3   LOAD, MA    -12 ($R_p$), $R_k$

4   STORE, MA   $R_l$, +12 ($R_p$)

FIG. 3F
(PRIOR ART)

$R_p = \& A[2]$
LOOP
1   LOAD   $0(R_p), R_g$
2   STORE   $R_h, -4(R_p)$
3   LOAD   $4(R_p), R_k$
4   STORE   $R_l, -8(R_p)$
   $R_p = R_p + 4$
ENDLOOP

FIG. 6A $R_p = \& A[2]$
LOOP
3   LOAD   $4(R_p), R_k$
1   LOAD   $0(R_p), R_g$
4   STORE   $R_l, -8(R_p)$
2   STORE   $R_h, -4(R_p)$
   $R_p = R_p + 4$
ENDLOOP

FIG. 6B $R_p = \& A[3]$
LOOP
3   LOAD, MA   $-4(R_p), R_k$
1   LOAD, MA   $-8(R_p), R_g$
4   STORE, MA   $R_l, 4(R_p)$
2   STORE, MA   $R_h, 12(R_p)$
ENDLOOP

FIG. 6C

CYCLE 0   3, 1
CYCLE 1   4, 2

FIG. 7A

$R_p$ = &A[2]
LOOP    LOAD    4($R_p$),$R_k$    LOAD    0($R_p$), $R_g$
        STORE   $R_l$, -8($R_p$)  STORE   $R_h$, -4($R_p$)
        $R_p$ = $R_p$ + 4
ENDLOOP

CYCLE 0
CYCLE 1

LOOP

| | | |
|---|---|---|
| CYCLE 0 | LOAD, MA | -4 ($R_p$), $R_k$ |
| CYCLE 1 | STORE, MA | $R_l$, 4 ($R_p$) |

ENDLOOP

LOOP

| | | |
|---|---|---|
| CYCLE 0 | LOAD, MA | -8 ($R_p$), $R_g$ |
| CYCLE 1 | STORE, MA | $R_h$, 12 ($R_p$) |

ENDLOOP

FIG. 7C $R_q$ = &A[2]
$R_p$ = &A[3]

LOOP

| | | |
|---|---|---|
| CYCLE 0 | LOAD, MA | -12 ($R_p$), $R_x$ |
| CYCLE 1 | STORE, MA | $R_l$, 16 ($R_p$) |

ENDLOOP

LOOP

| | | |
|---|---|---|
| CYCLE 0 | LOAD, MA | -4 ($R_q$), $R_g$ |
| CYCLE 1 | STORE, MA | $R_h$, 8 ($R_q$) |

ENDLOOP

FIG. 7D

|         |         |                          |                    |
|---------|---------|--------------------------|--------------------|
| | $R_q$ = &A[2] | | |
| | $R_p$ = &A[3] | | |
| | $R_c$ = 16 | | |
| | LOOP | | |
| CYCLE 0 | | LOAD, MA $-12(R_p), R_k$ | LOAD, MA $-4(R_q), R_g$ |
| CYCLE 1 | | STORE, MA $R_l, R_c(R_p)$ | STORE, MA $R_h, 8(R_q)$ |
| 810 | ENDLOOP | | |

FIG. 8A

|         |         |                          |                    |
|---------|---------|--------------------------|--------------------|
| | $R_q$ = &A[2] | | |
| | $R_p$ = &A[3] | | |
| | LOOP | | |
| CYCLE 0 | | LOAD, MA $-12(R_p), R_k$ | LOAD, MA $-4(R_q), R_g$ |
| CYCLE 1 | | STORE $R_l, (R_p)$ | STORE, MA $R_h, 8(R_q)$ |
| CYCLE 2 | | $R_p = R_p + 16$ | |
| 820 | ENDLOOP | | |

FIG. 8B $R_p = \& A[3]$
CYCLE 0  LOAD       $0(R_p), R_m$
CYCLE 1  LOAD      $-12(R_p), R_n$
         $R_p = R_p + 4$ $R_p = A[3]$
$R_q = A[0]$
CYCLE 0  LOAD, MA      $4(R_p), R_m$
CYCLE 1  LOAD, MA      $4(R_q), R_n$ $R_p = \& A[3]$
CYCLE 0  LOAD, MA      $-12(R_p), R_m$
CYCLE 1  LOAD               $(R_p), R_n$
CYCLE 2  $R_p = R_p + 16$

```
double A [ 32 ] ;
main ( )
{
    int i ;
    for (i = 0; i < 32 ; i + +)
    {
        A [ i ] = A [ i ] + 1.0 ;
    }
}
```

FIG. 11A

```
    R_c = 1.0
    R_p = & A [ 0 ]
LOOP
    FLOAD   ( R_p ) , R_a
    FADD    R_s = R_a + R_c
    FSTORE  R_s , ( R_p )
    ADD     R_p = R_p + 8
ENDLOOP
```

FIG. 11B

| CYCLE | INSTRUCTION |
|---|---|
| 0 | FLOAD $(R_p), R_a$ |
| 1 | ---------- |
| 2 | ---------- |
| 3 | ---------- |
| 4 | FADD $R_s = R_a + R_c$ |
| 5 | ---------- |
| 6 | ---------- |
| 7 | ---------- |
| 8 | FSTORE, MA $R_s, 8(R_p)$ |

FIG. 11C

| CYCLE | STAGES |
|---|---|
| 0, 1, 2 | A |
| 3, 4, 5 | B |
| 6, 7, 8 | C |

FIG. 11D

EFFICIENT USE OF THE BASE REGISTER AUTO-INCREMENT FEATURE OF MEMORY ACCESS INSTRUCTIONS

BACKGROUND OF THE INVENTION

1. Field of the Invention

This invention relates in general to compiler algorithms for reducing address computation overhead and, in particular, to compiler algorithms for reducing address computation overhead for microprocessor or computer system architectures that support an auto-increment feature for memory access instructions.

2. Description of the Prior Art

Conventional microprocessor and computer architectures typically provide a base+displacement addressing mode. A limited number of computer architectures provide an addressing mode that supports a base register auto-increment feature. Examples of computer architectures which support a base-register auto-increment addressing mode include: the IBM 370, the Digital PDP-11/VAX architectures, the Apollo PRISM architecture, the IBM R/S 6000 architecture, and the PA-RISC architecture.

FIG. 1 shows two examples of memory access instructions that specify the autoincrement addressing mode. Example 1 of FIG. 1 is an example of an auto-increment memory access instruction where the base register auto-increment occurs after the memory access. The load instruction results in the contents of the memory location specified by base register R10 being loaded into register R11. Only after the load into register R11 are the contents of base register R10 "post-incremented" by 4. Hence, the ",MA" (modify after) completer on the load opcode. In contrast, the instruction in Example 2 is an example of a memory access instruction where the base register auto-increment occurs before the memory access. In Example 2, the contents of base register R9 are "pre-incremented" by –4 before the store occurs. After R9 is pre-incremented by –4, the contents of register R8 are stored in the memory location specified by base register R9. Hence, the ",MB" (modify-before) completer on the store opcode. Without loss of generality, we will refer to the post-increment addressing mode in the remainder of this application. The observations and algorithms herein apply equally well to the use of the pre-increment addressing mode.

The compiler is software that translates source code written in a high-level programming language, such as C, BASIC, or FORTRAN, into a binary image that runs on the computer hardware. It is the compiler's job to take advantage of the powerful features of the computer architecture, such as the post-increment addressing mode, to reduce the address computation overhead in order to increase computer performance. FIG. 2 shows a block schematic diagram of a software compiler. Referring to FIG. 2, the front end is responsible for checking the syntactic correctness of the source code. For example, if the compiler is a C compiler, it is necessary to make sure that the code is legal C code. The compiler front end component 200 reads a source code file 202 and translates it into a high level intermediate representation 210. A high level optimizer 222 may be optionally invoked to optimize the high level intermediate representation 210 into a more efficient form.

The code generator 230 translates the high level intermediate representation 210 to a low level intermediate representation 232. The low level intermediate representation 232 generated by a code generator is typically fed into a low level optimizer. The low level optimizer 234 converts the low level intermediate representation 232 into a more efficient (machine-executable) form. The object file generator 250 writes out the optimized low-level intermediate representation into an object file 252. The object file 252 is processed along with other object files 254 by a linker 260 to produce an executable file 262 which can run on the computer 264.

Both the high level and low level optimizer components 222, 234 of the compiler must preserve the program semantics (i.e. the meaning of the instructions that are translated from source code to a high level intermediate representation, and thence to a low level intermediate representation and ultimately an executable file), but may transform the code in a way that allows the computer to execute an "equivalent" set of instructions in less time. Modern compilers are structured with a high level optimizer (HLO) that typically operates on a high level intermediate representation and substitutes in its place a more efficient high level intermediate representation of a particular program. For example, an HLO might eliminate redundant computations. With the low level optimizer (LLO), the over-arching objectives are largely the same as the HLO, except that the LLO operates on a representation of a program that is much closer to what the machine actually understands.

Memory accesses that occur in loops which specify an address that is a linear function of a loop induction variable are prime candidates for exploiting a post-increment addressing mode. FIG. 3A shows an example of C source code where the memory accesses occur in a loop and where the address is a linear function of a loop induction variable. The memory accesses reference a 10 element global array variable, A, where each element is assumed to be four bytes in size. FIG. 3B shows a series of memory access operations for implementing the C source code shown in FIG. 3A. The numbers to the left of the memory operations indicates the program order of the memory operations.

Typically, compiler algorithms attempt to exploit the auto-increment capabilities of memory operations that occur in loops in the loop optimization phase. FIG. 3C shows the result of transforming the memory operations in FIG. 3B to use the a post-increment addressing mode where a different base register is used for each memory access instruction. FIG. 3D shows a hypothetical preferred scheduling order for the operations shown in FIG. 3B. Note that the preferred order of instructions is different than the order of the instructions shown in FIG. 3B. FIG. 3E shows the instructions shown in FIG. 3C in the preferred scheduling order shown in FIG. 3D. Although the code transformation shown in FIG. 3C (using the post-increment addressing mode with a different base register for each memory access instruction) allows the instructions to be reordered into the preferred sequence shown in FIG. 3D, it does so at the cost of using an increased number of base registers.

FIG. 3F shows the result of transforming the memory operations of FIG. 3B using post-increment memory access instructions where the same base register is used for each memory access instruction. The transformed instructions shown in FIG. 3F cannot be reordered to achieve the preferred scheduling order due to data dependencies on the common post-incremented base register $R_p$.

FIG. 4 is a block diagram showing a low level optimizer 234. In a computer architecture that supports an auto-increment addressing mode, the loop optimization phase of a compiler includes the steps of (1) identifying opportunities for post-increment synthesis 272 and (2) transforming candidate memory instructions into auto-increment memory operations 274. Post-increment synthesis is performed as part of a loop optimization phase that operates on a low-level representation of the source program. The synthesis performed in the loop optimization phase typically precedes the instruction scheduling phase 278 of the optimizer.

A problem with synthesizing post-increment instructions prior to instruction scheduling is that register data dependencies are introduced between memory access instructions that refer to shared (post-incremented) base register operands. (See code sequence shown in FIG. 3F). These register data dependencies can adversely affect the quality of the instruction schedule that can be achieved if those memory access instructions were not otherwise dependent on each other. Specifically, the order in which memory access instructions that share a common post-incremented base register appear in the final schedule is constrained. In addition, for instructions that end up sharing a common post-incremented base register, opportunities to schedule otherwise independent memory access instructions in the same processor clock cycle may be lost. These problems are exacerbated in loops that are subject to software pipelining since the sequence of base-register post-increment operations will typically form a cycle and thereby constrain the intermingling of memory operations from different loop iterations in the modulo-scheduled kernel.

Address computation overhead can be a performance limiter especially for an instruction-set architecture where memory addresses are specified for loads and stores by a single base register operand. The performance impact is more pronounced for implementations of such architectures with modest amounts of AI,U bandwidth which can be used for address computation. Some architectures provide a simple base register-indirect addressing mode, with an optional post-increment feature. Thus, for such architectures for codes that have a rich mixture of integer ALU operations, it is important for the compiler to reduce ALU use for address computation by making effective use of the post-increment feature. Further, the compiler algorithm for exploiting post-increment addressing mode should operate in a way that does not unduly constrain the instruction scheduler.

A compiler optimization algorithm that reduces address computation overhead for architectures that support an auto-increment addressing mode for memory access instructions is needed. Further, the compiler algorithm should avoid the drawbacks of traditional approaches to post-increment synthesis and in addition should provide support for memory references occurring in the software pipelined loops.

SUMMARY OF THE INVENTION

The present invention provides a compiler optimization algorithm that reduces address computation overhead for architectures that support an auto-increment addressing mode for memory access instructions. The compiler algorithm identifies opportunities for auto-increment synthesis in a low level intermediate representation. Candidate loads and stores are transformed to use a base+displacement addressing mode. Such an addressing mode may or may not be supported in the target architecture. After instruction scheduling, such pseudo instructions are transformed back into actual memory operations that auto-increment their base register operands to set up the effective address of subsequent memory instructions. Because synthesis of auto-incrementing memory access instructions is performed after the instruction scheduling phase, the aforementioned drawbacks of the conventional auto-increment synthesis approach are avoided.

The compiler optimization algorithm according to the present invention splits the task of auto-increment synthesis into two steps. First, the compiler algorithm identifies candidate memory reference instructions that could take advantage of the auto-increment addressing mode. The main candidates are memory access instructions that occur in loops which specify an address that is a linear function of a loop induction variable. The candidate memory access instruction is transformed to use a possibly fictitious (pseudo) base+displacement addressing mode. The instruction scheduler phase is then allowed to schedule these instructions much like ordinary memory access instructions. The second step of the compiler optimization algorithm is the step of transforming the scheduled pseudo memory operations back into the actual memory operations that use the auto-increment addressing mode. The first step of identifying likely targets for auto-increment optimization is performed prior to instruction scheduling. The step of transforming the pseudo instructions to code that uses the auto increment addressing mode is performed after instruction scheduling, but before register allocation.

To facilitate the use of the auto-increment feature of memory access instructions occurring in loops that specify an address which can be expressed as a simple linear function of a loop induction variable, candidate memory access instructions are identified as part of the loop optimization phase. However, unlike traditional approaches which also materialize auto-increments prior to scheduling, the actual synthesis of the auto-increment operation is delayed until after the instruction scheduling phase. Instead, memory access instructions that are candidates for auto-increment synthesis are transformed during the first phase into a (pseudo) memory opcode that supports a (base+displacement) addressing mode. The base register is initialized outside the loop body and is updated within the loop body in parallel with the associated loop induction variable. The base register update that is typically needed at the end of the loop is performed by a separate pseudo-instruction that specifies the amount by which the base register needs to be incremented for the next loop iteration.

The scheduling phase is then invoked and treats the pseudo memory access instructions as normal memory access instructions. No artificial base register dependencies are assumed between such instructions and hence they are free to be scheduled in any relative order or even scheduled for execution in the same clock cycle, provided all other data dependencies are satisfied. The ALU operation needed to sum the base register and displacement amount for each pseudo memory access instruction is assumed to be performed implicitly and is not expressed as a separate explicit instruction in the code stream prior to instruction scheduling. Once the instruction schedule is generated, the second phase of auto-increment synthesis is invoked. The second phase examines the locations of the pseudo-memory instructions that share the same base register in the generated schedule. The pseudo memory instructions that share the same base register are then converted into real executable memory operations that auto-increment their base register operand just enough to set up the effective address for a subsequent memory operation.

The step of transforming the scheduled (base+displacement) memory access instruction includes the step of modifying the base register operand of the instruction so that the modified base register value corresponds to the memory address specified by a subsequent memory access instruction. By directly sourcing the auto-incremented base register value in the subsequent memory access instruction, an ALU instruction is saved that would otherwise be needed to set up the memory address for the downstream memory access instruction, thus reducing the address computation overhead.

The compiler algorithm is applicable to architectures having various addressing modes including: base+displacement or base+index register. It is applicable to any machine that supports an auto-increment capability for memory access instructions, although the benefits are more pronounced for machines that only support a simple register-indirect form of effective address specification.

For auto-increment immediate amounts that exceed the maximum field-width, an index register is initialized outside the loop body and the pseudo-memory operation is transformed into a memory instruction that auto-increments its base register operand by the pre-initialized index register. Pseudo-memory operations that share the same base register but have been scheduled in the same clock cycle are handled specially, by optionally "cloning" a new base register. In situations where the effective address can't be "threaded" around the loop via auto-incrementing memory operations, the algorithm allows for "spill code" to be inserted into the generated schedule at locations which have minimal impact on the path-length. In particular, spill code may need to be inserted into the scheduled code when an auto-increment amount is too large and a register relative auto-increment addressing mode is not available in the target architecture.

The compiler optimization algorithm is applicable to code which includes software pipelined loops and allows the generation of software pipeline schedules with lower initiation intervals (ii) for loops that are dominated by a large number of ALU operations. After the software pipeliner generates a schedule for a particular initiation interval, the generated software pipeline is subject to auto-increment synthesis. Once again it is possible that "spill" code may need to be inserted into the software pipeline. If such spill code cannot be accommodated into the generated software pipeline for the current "ii", the generated software pipeline is discarded and a new software pipeline is sought for a larger initiation interval.

A further understanding of the nature and advantages of the invention described herein may be realized by reference to the remaining portion of the specification and the attached drawings.

BRIEF DESCRIPTIONS OF THE DRAWINGS

FIG. 1 shows two examples of memory access instructions that use an auto-increment addressing mode.

FIG. 3A shows a C source fragment where memory accesses occur in a loop.

FIG. 3B shows a series of memory access operations corresponding to the memory accesses that occur in the loop shown in FIG. 3A.

FIG. 3C shows a first implementation of FIG. 3B using a different base register for each post-incrementing memory access instruction.

FIG. 3D shows an example of a preferred scheduling order of the instructions for the operations shown in FIG. 3B.

FIG. 3E shows the instruction shown in FIG. 3C arranged in the preferred scheduling order shown in FIG. 3D.

FIG. 3F shows a second implementation of FIG. 3B using post-increment memory access instructions.

FIG. 6A is an implementation of the memory access instructions shown in FIG. 3B using a base+displacement addressing mode.

FIG. 6B shows the implementation of FIG. 6A in the preferred scheduling order shown in FIG. 3D.

FIG. 6C shows the scheduled code shown in FIG. 6B after transforming the memory access instructions to use the post-increment addressing mode instead of the base+displacement addressing mode.

FIG. 7A shows an example of a preferred scheduling order for the series of memory access operations shown in FIG. 3B for a computer that can perform two instructions simultaneously.

FIG. 7B shows the instructions shown in FIG. 3B arranged in the scheduling order shown in FIG. 7A.

FIG. 7C shows the memory access instructions of FIG. 7B transformed to use the post-increment addressing mode instead of the base+displacement addressing mode, resulting in an illegal schedule.

FIG. 7D shows the transformation of the memory operations shown in FIG. 7B to make use of a base register clone ($R_q$) to preserve the two-cycle schedule.

FIG. 8A shows the instructions shown in FIG. 3B scheduled according to the sequence shown in FIG. 7A.

FIG. 8B shows an implementation of the instructions shown in FIG. 3B according to the scheduling order of FIG. 7A.

FIG. 11A shows a C source program that strides through an array "a" containing 32 8-byte double precision elements and increments each array element by 1.0.

FIG. 11B shows the optimized machine instructions that might be generated by a modern optimizing compiler prior to instruction scheduling.

FIG. 11C shows the list schedule for the optimized machine instructions shown in FIG. 11B.

FIG. 11D illustrates the division of the list schedule of FIG. 11C into three distinct, equal-length stages, named for convenience as A, B, C, with each stage representing 3 cycles worth of execution.

DETAILED DESCRIPTION OF THE PREFERRED EMBODIMENTS

Figure 5:
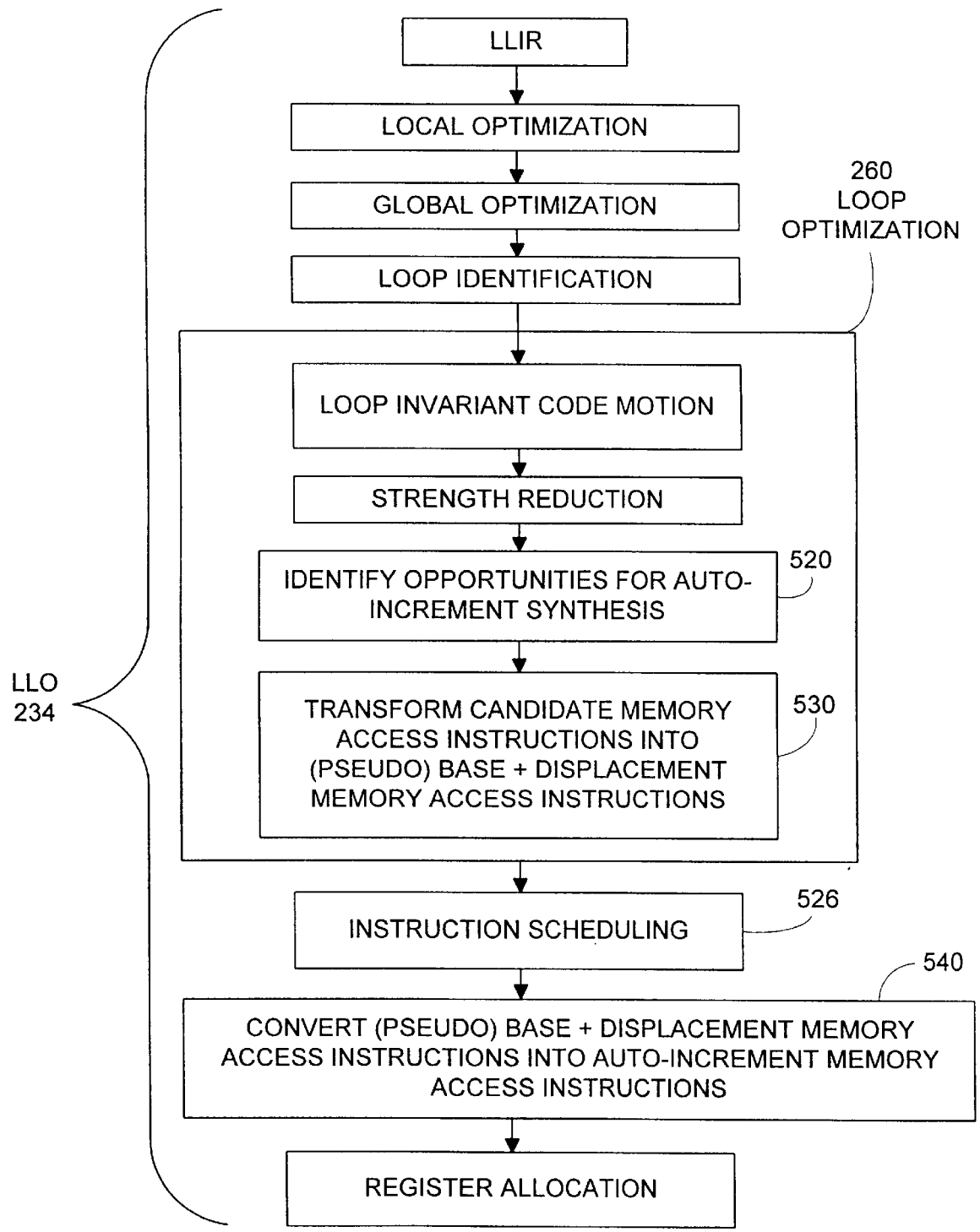
FIG. 5 is a block diagram of the low diagram of the low level optimizer according to the present invention.

FIG. 5 shows a block diagram of the low level optimizer according to the present invention. Part of the compiler optimization process is the identification of candidate memory reference instructions that could take advantage of the post-increment addressing mode 520. The step of identifying likely candidates for using the post-increment addressing mode is performed prior to instruction scheduling 526. Although there may be other candidates that can take advantage of a post-increment addressing mode, the main candidates are memory access instructions that occur in loops which specify an address that is a linear function of a loop induction variable.

To facilitate the use of the post-increment feature for memory access instructions occurring in loops that specify an address which can be expressed as a simple linear function of a loop induction variable, candidate memory access instructions are identified as part of the loop optimization phase 260. However, unlike traditional approaches which also materialize post-increments prior to scheduling, the actual synthesis of the post-increment operation is delayed until after the instruction scheduling phase 526.

Figure 2:
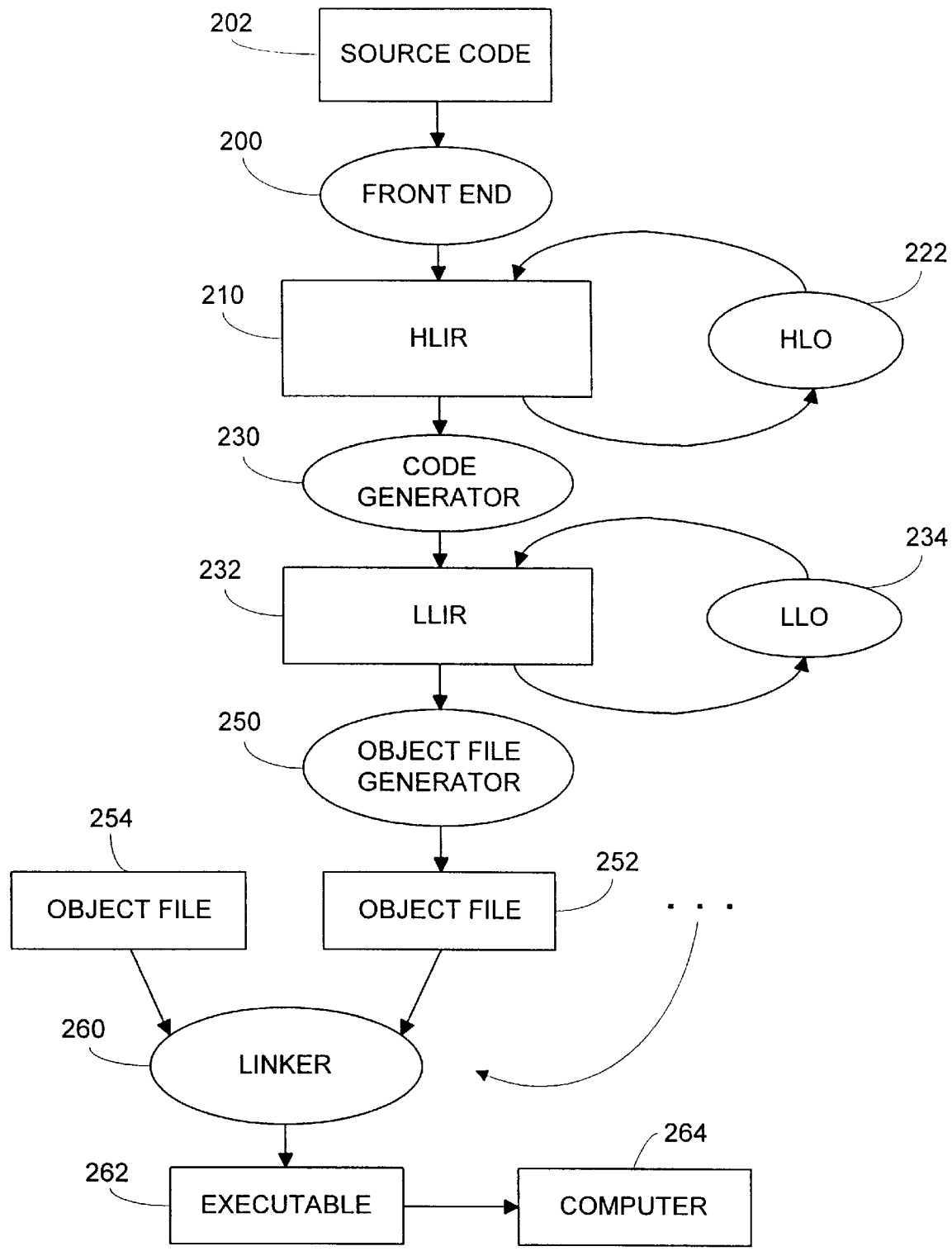
FIG. 2 shows a block schematic diagram of a modern optimizing compiler.
Figure 4:
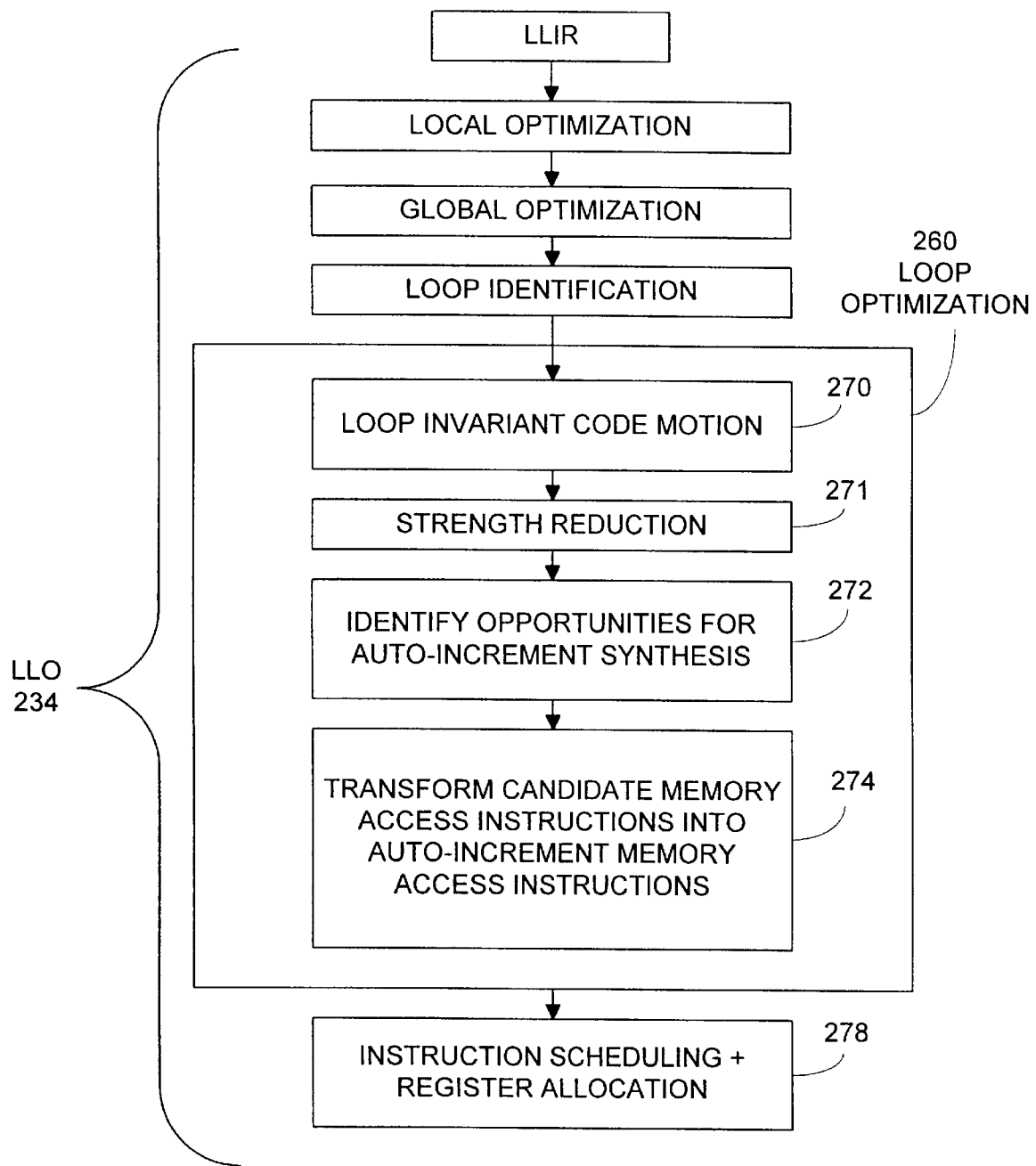
FIG. 4 is a block diagram of a conventional low level optimizer.

Memory access instructions that are candidates for post-increment synthesis are transformed during a first phase into a possibly fictitious memory access instruction that uses a (base+displacement) addressing mode 530. This is in contrast to conventional optimization algorithms (see FIG. 4) where the candidate memory access instructions are transformed immediately into auto-increment instructions 274. In the present compiler algorithm, the base register is initialized outside the loop body and is updated within the loop body in parallel with the updates to the associated loop induction variable (see implementation shown in FIG. 6A). The base register update that is typically needed at the end of the loop is performed by a separate pseudo-instruction that specifies the amount by which the base register needs to be incremented for the next loop iteration.

FIG. 6A illustrates the memory access operations shown in FIG. 3B after they have been transformed to use a base+displacement addressing mode (step 530). The numbers to the left of the memory access instructions indicate their execution sequence. The common base register, $R_p$, is initialized outside the loop to hold the address of A[2]. It is incremented by four at the end of the loop body by a pseudo add instruction. After the memory access instructions that are candidates for post-increment synthesis are transformed to use a base+displacement addressing mode (step 530), the instruction scheduler phase (526) is invoked.

FIG. 6B shows the memory access instructions of FIG. 6A in the preferred scheduling order shown in FIG. 3D. The instruction scheduler treats the pseudo memory access instructions shown in FIG. 6B as normal memory access instructions. No artificial base register dependencies are assumed between such instructions and hence they are free to be scheduled in any relative order or even scheduled for execution in the same clock cycle, provided all other data dependencies are satisfied. The ALU operation needed to sum the base register and displacement amount for each pseudo memory access instruction is assumed to be performed implicitly and is not expressed as separate explicit instruction in the code stream prior to instruction scheduling. The pseudo add instruction that updates the base register $R_p$ is assumed by the scheduler to take zero cycles and not consume any machine resources.

Once the instruction schedule is generated, the second phase of post-increment synthesis is invoked. The second phase of the compiler optimization algorithm involves the step of transforming the scheduled pseudo memory access instructions back into actual memory access instructions that use the post-increment addressing mode (step 540). FIG. 6C shows the scheduled code shown in FIG. 6B after transforming the memory access instructions to use a post-increment addressing mode instead of the (base+displacement) addressing mode. The second phase examines the locations of the pseudo-memory instructions that share the same base register in the generated schedule. The pseudo memory access instructions that share the same base register are converted into executable memory access instructions that post-increment their base register operand just enough to set up the effective address for a subsequent memory access instructions.

The compiler algorithm supports architectures having various addressing modes including: (base+displacement) or (base+index register). It is applicable to any machine that supports an auto-increment capability for memory access instructions, although the benefits are more pronounced for machines that only support a simple register-indirect form of effective address specification.

FIG. 7A shows an example of a preferred scheduling order for the series of memory access instructions shown in FIG. 3B for a computer that can execute two instructions simultaneously. FIG. 7B shows the instructions shown in FIG. 3B arranged in the scheduling order shown in FIG. 7A. For the scheduling order shown in FIG. 7A, the load instructions 710, 712 are performed simultaneously in cycle 0 and the store instructions 714, 716 are performed simultaneously in cycle 1.

According to the compiler algorithm of the present invention, after instruction scheduling, candidate loads and stores that use the (base+displacement) addressing mode are transformed into memory access instructions that auto-increment their base register operands to set up the effective address of subsequent memory access instructions. However, post-increment synthesis (transforming memory access instructions to exploit the post-increment addressing mode) becomes more complicated when multiple (base+displacement) pseudo memory access instructions that share a common base register are scheduled in the same cycle (as shown in FIG. 7B).

FIG. 7C shows the transformation of the memory operations in FIG. 7B to use the post-increment addressing mode instead of the (base+displacement) addressing mode. However, the implementation shown in FIG. 7C is not quite correct. The problem with the code sequence shown in FIG.

7C is that there are register dependencies between the instructions that are to be executed in the same cycle. We cannot make a memory reference post-increment a base register for another memory reference that occurs in the same cycle. For example, in cycle 0, the base register $R_p$ is being overwritten by the first instruction and read by the second instruction simultaneously. For the implementation shown in FIG. 7C, the two load or store instructions would need to be performed consecutively to avoid data dependencies. Thus, the four memory operations would take four cycles to execute, as opposed to the expected two cycles for the scheduled code sequence shown in FIG. 7B.

To prevent this problem from occurring, when multiple (base+displacement) memory access instructions are scheduled in the same clock cycle, the algorithm arranges for new base registers, hereinafter the base register clones, to be used in the concurrently scheduled memory operations. Use of the base register clone eliminates data dependencies between such instructions. FIG. 7D shows the transformation of the memory operations shown in FIG. 7B to make use of a base register clone ($R_q$) to preserve the two-cycle schedule.

Figure 7E:
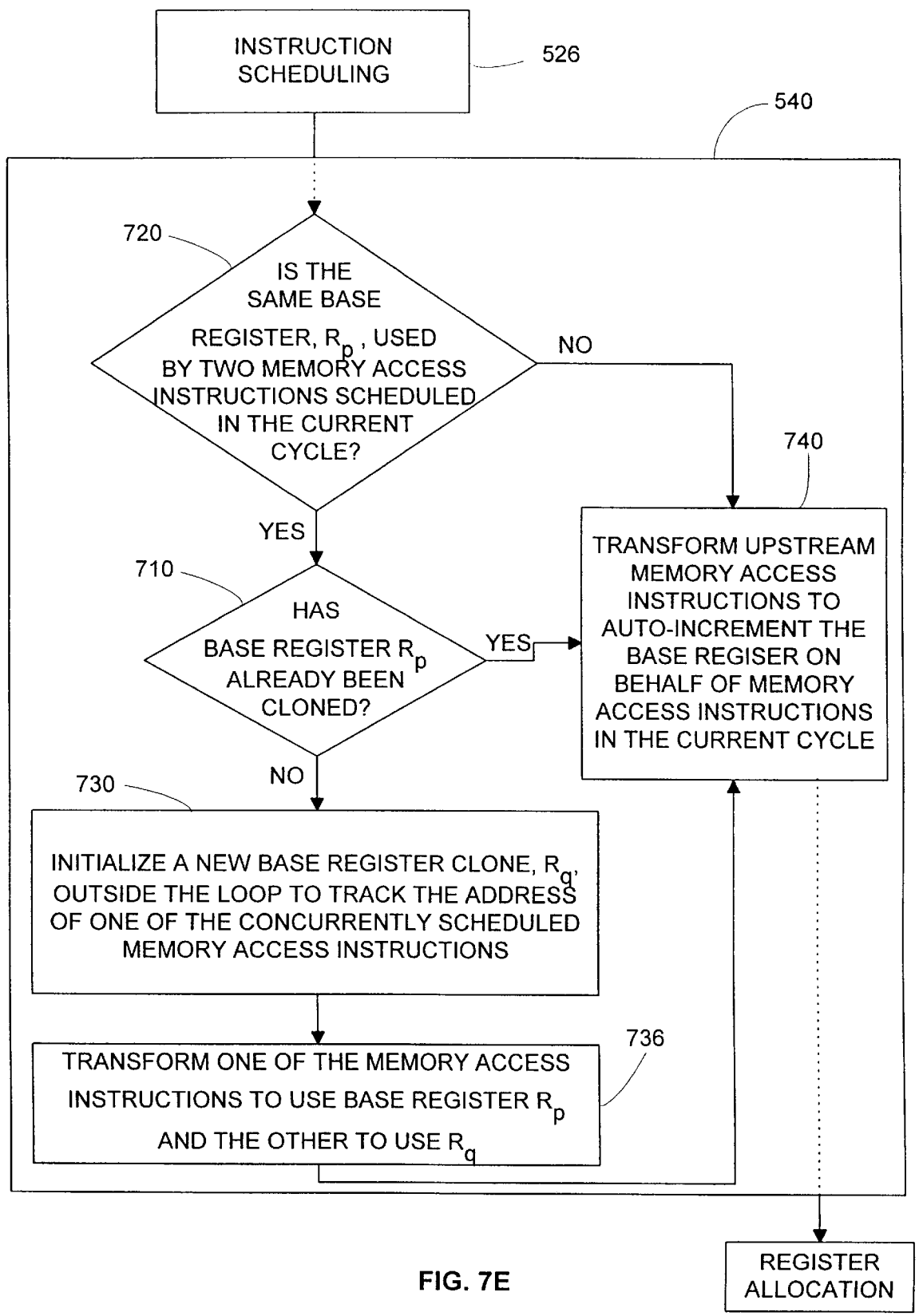
FIG. 7E shows a flow chart of the logic used to clone base registers for a machine that can execute two memory operations in each cycle.

FIG. 7E shows a flow chart of the logic used to clone base registers for a machine that can execute two memory operations in each cycle. The logic shown in FIG. 7E can easily be extended to clone base registers for machines that can execute more than two memory access instructions concurrently. Referring to FIG. 7E, the compiler algorithm first does a check to see if the same base register is used by two memory access operations in the same clock cycle (step 720). If the same base register is used by two memory access operations in the same clock cycle, then one of the two memory instructions is transformed to use the original base register (suitably post-incremented by an upstream memory access instruction) and the other memory instruction is transformed to use a "clone" of the original base register (step 736). After cloning the base register, the (base+displacement) memory access instructions are transformed into auto-increment memory access instructions (740). The steps performed inside the block 540 in FIG. 7E are repeated for each cycle in the schedule containing a memory access instruction until all of the pseudo (base+displacement) memory access instructions are processed.

Another complicating factor with the compiler algorithm occurs when the effective address of the memory reference cannot be set up by an upstream post-increment. Consider the example where the post increment amount for the target architecture must be four bits or less but the desired post increment amount cannot be represented in four bits. For instance, since the range of signed post-increment values representable in four bits is between −16 and +15, a post-increment amount of +16 is not allowed. FIG. 8A shows the instructions shown in FIG. 3B scheduled according to the sequence shown in FIG. 7A. The code sequence shown in FIG. 8A accounts for the fact that the target amount is larger than four bits. In particular, the first store in FIG. 8A uses an index register $R_c$. $R_c$ is initialized to 16 outside the loop and is used to increment the value of the base register $R_p$. The store instruction 810 illustrates the use of the register post-increment addressing mode.

Although the implementation shown in FIG. 8A is an option for architectures that support a register post-increment addressing mode, not all architectures need support this addressing mode. In cases where the effective address of the memory reference can not be set up by an upstream post-increment (for whatever reason), an explicit add operation will need to be inserted into the scheduled code in much the same manner that a register allocator inserts spill code. The "spill code" operations are subject to post-register allocation instruction scheduling. FIG. 8B shows the instructions shown in FIG. 3B scheduled in the order shown in FIG. 7A for a case where the architecture only supports a four bit post-increment value and does not support a register post-increment addressing mode.

Comparing the example shown in FIG. 8A to the example shown in FIG. 8B, the base register $R_c$ is eliminated since register post-increment addressing is not supported and the post-increment store instruction is changed to an ordinary store instruction. Instead of the store instruction post-incrementing its base register, the base register is explicitly incremented by the spill code instruction 820. Ideally, the insertion of the spill code in the schedule should be done in an efficient manner. Preferably the spill code instruction should be scheduled in a cycle where it can be executed concurrently with some other instruction. The expectation is that these operations can be accommodated into the final schedule with minimal performance impact.

Figure 9:
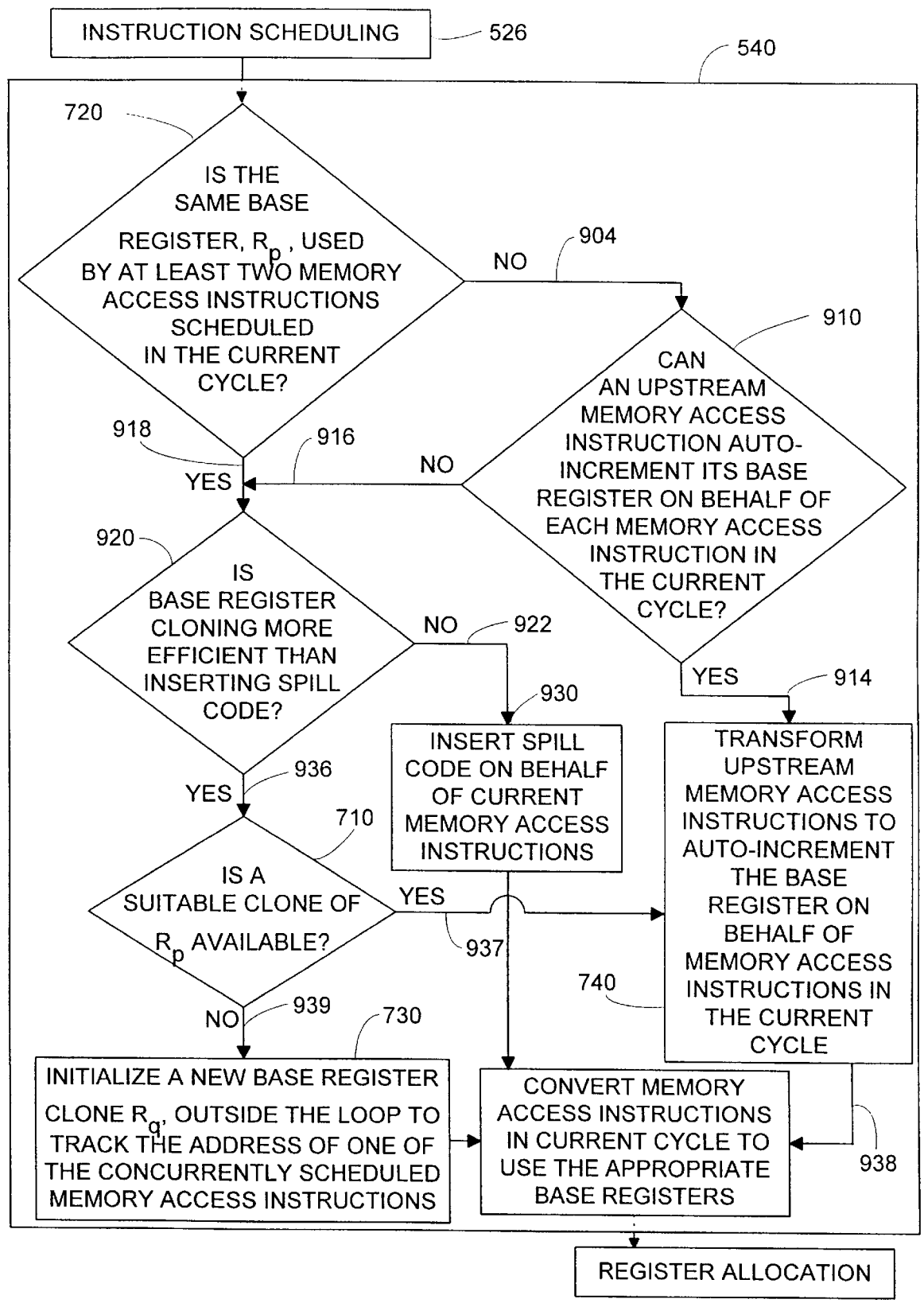
FIG. 9 shows a flow chart of the logic used to exploit the auto-increment addressing mode for a machine capable of executing multiple memory operations in each cycle where the auto-increment synthesis may require either base register cloning or insertion of spill code.

FIG. 7E shows a flowchart of the steps implementing the compiler algorithm according to the present invention where base register cloning is used for a machine that can execute two memory operations in each cycle. FIG. 9 shows the flow chart of FIG. 7E altered to support a machine capable of executing multiple memory operations in each cycle where either base register cloning or spill code insertion may be used to facilitate post-increment synthesis. The first step implemented by the flowchart shown in FIG. 9 is checking to see if the same base register is used by two memory access instructions scheduled in the same clock cycle (step 720). If different base registers are used (904), then a check is made to determine whether an upstream memory access instruction can auto increment its base register on behalf of each memory access instruction scheduled in the current cycle. If a memory access instruction that can auto-increment its base register on behalf of each memory access instruction scheduled in the current cycle is available (914), then the upstream memory access instructions are auto-incremented on behalf of the memory access instructions scheduled in the current cycle (740). The memory access instructions scheduled in the current cycle are then converted to use the appropriate base registers (938).

If an upstream memory access instruction is not available to auto-increment its base register on behalf of a memory access instruction scheduled in the current cycle (916) or if the same base register is used by at least two memory access instructions scheduled in the same cycle (918), then a test is made to determine whether base register cloning is more efficient than inserting spill code (920). If inserting spill code is more efficient (922), then spill code is inserted on behalf of the current memory access instructions (step 930). If base register cloning is more efficient (936), then a check is made to determine if a suitable cloned base register is available. If a suitable base register clone is available (937), then the upstream memory access instructions are transformed to auto-increment their base register on behalf of the memory access instructions in the current cycle (740). The memory access instructions scheduled in the current cycle are then converted to use the appropriate base registers (938). If a suitable base register clone is unavailable (939), then a new base register clone is properly initialized (730) before conversion of the memory access instruction in the current cycle to use the appropriate base registers (938).

Figures 10A, 10B, 10C, 10D:
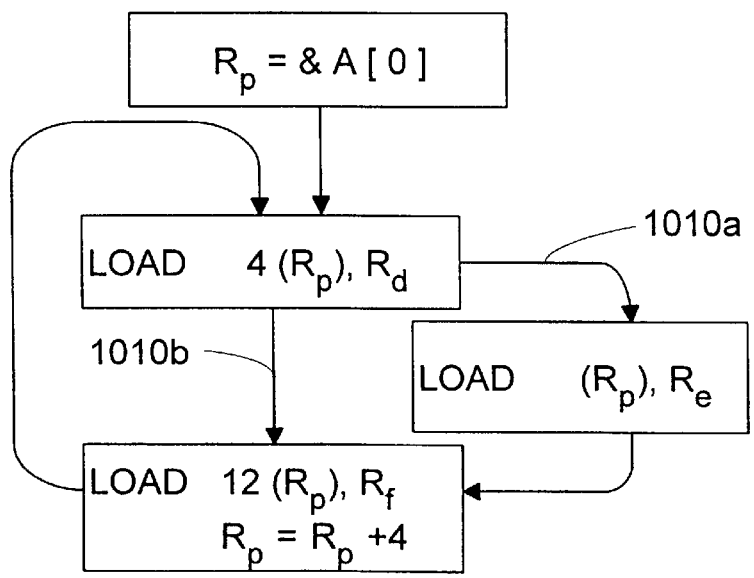
FIGS. 10A and 10B shows a first alternative implementation of the instructions shown in FIG. 10A where the base register has been cloned.
FIG. 10C shows a second alternative implementation of the instructions shown in FIG. 10A where spill code insertion has been performed.
FIG. 10D shows an example of a loop that includes three load instructions and branching logic.

Step 920 determines whether base register cloning or inserting spill code is more efficient. FIG. 10A shows an example with two memory access instructions scheduled for a machine that can perform one memory operation and one ALU operation in the same cycle. Assuming a target architecture supporting a post-increment amount of four bits or less, the second load in FIG. 10A would not be able to use the auto-incrementing addressing mode. In particular, the second load will need to specify a post-increment amount of 16 which is not supported by the target architecture.

FIG. 10B shows a first alternative implementation of the instructions shown in FIG. 10A where the base register cloning technique has been used. FIG. 10C shows a second alternative implementation of the instructions shown in FIG. 10A where the spill code insertion technique has been used. Because of the extra cycle required to execute the instructions shown in FIG. 10C, the optimizer would probably choose base register cloning as being more efficient in step 920.

Figure 10E:
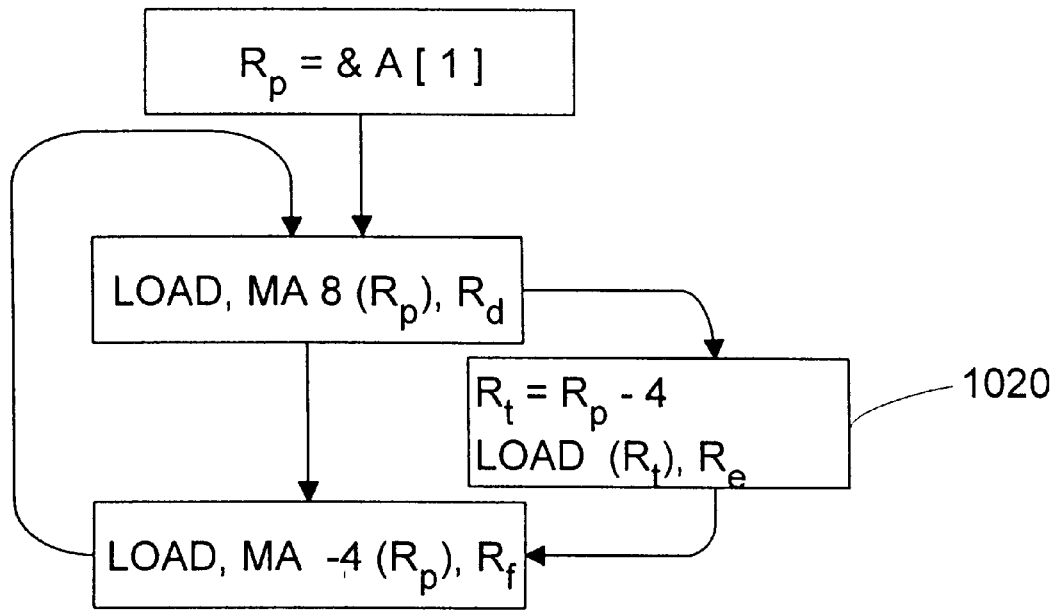
FIG. 10E shows an implementation of the example shown in FIG. 10D after post-increment synthesis where spill code has been inserted into the loop.
Figure 10F:
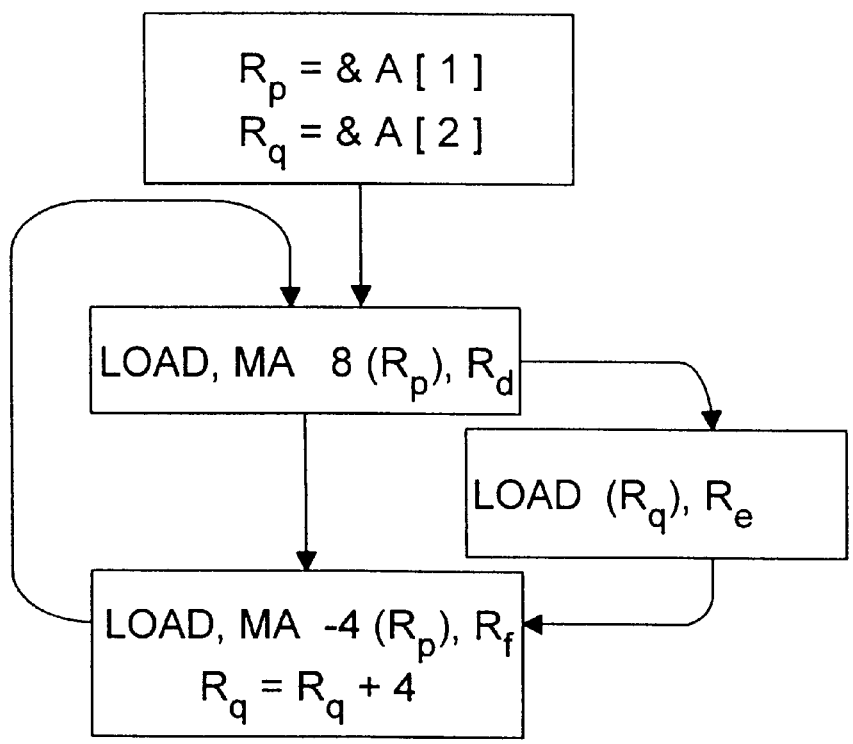
FIG. 10F shows an implementation of the example shown in FIG. 10D after post-increment synthesis where the base register has been cloned.

FIG. 10D shows an example of a loop that includes three load instructions and branching logic. In the example shown in FIG. 10D, the branch may take path 1010a or 1010b. FIG. 10E shows an implementation of the example shown in FIG. 10D where spill code has been inserted into the loop. In the example shown in FIG. 10E, the series of instructions of FIG. 10D are transformed to use a post-increment addressing mode and spill code 1020 is inserted to compensate for the branch along path 1010a. An alternate embodiment is shown in FIG. 10F. FIG. 10F shows an implementation of the example shown in FIG. 10D where base register cloning is used instead of spill code insertion. Since base register cloning in this example, does not save any instructions (in fact it results in an instruction being inserted at a more expensive location) and adds to the total number of base registers required, in this example inserting spill code would probably be judged more efficient (step 920) by the optimizer.

The post-increment synthesis technique also works in conjunction with software-pipelining. Software-pipelining is an instruction scheduling technique that is applicable to loops. To illustrate the basic software-pipelining technique, consider FIG. 11A. FIG. 11A shows a C source program that strides through an array "A" containing 32 8-byte double precision elements and increments each array element by 1.0. The optimized machine instructions that might be generated by a modern optimizing compiler prior to instruction scheduling is shown in FIG. 11B. In FIG. 11B the instructions to control the iteration count of the loop have been omitted for simplicity.

Referring to the optimized machine instructions shown in FIG. 11A, note that the register $R_p$ is initialized outside the loop and used as the base register in both a floating-point load (FLOAD) and a floating-point store (FSTORE) instruction to access the elements of the array variable "A". The base register $R_p$ is incremented by 8 in each loop iteration. Each array element value is loaded into register $R_a$ and summed with the contents of register $R_c$ (which is initialized outside the loop to hold the value 1.0), with the result being written into register $R_s$. The contents of register $R_s$ are then stored back to the array element.

Assume that the latencies for the 3 floating-point instructions shown in FIG. 11B are as follows: FLOAD—4 cycles, FADD—4 cycles, and FSTORE—1 cycle, where a latency of L cycles for an instruction I that writes a value into a register R implies that a subsequent instruction that wants to read the value written into register R can execute without experiencing pipeline stalls L cycles or more after instruction I is executed.

Given these latency assumptions, FIG. 11C indicates the number of cycles that will be required to execute each iteration of the loop shown in FIG. 11B. If we assume that the FLOAD instruction begins its execution at cycle 0, the Fadd instruction will only be able to start execution at cycle 4 and the result computed by the Fadd may only be stored at cycle 8. In other words, it will take a total of nine cycles to execute the three floating-point instructions for each loop iteration. Note that after instruction scheduling, the FSTORE instruction would be transformed to post-increment its base register, $R_p$, by 8, on behalf of the FLOAD that will be executed in the next loop iteration. (The instruction schedule shown in FIG. 11C is referred to as the "list" schedule because the scheduling algorithm considers the 'list' of instructions to be scheduled one at a time according to the list of data inter-dependencies.)

The software-pipelining algorithm attempts to improve the performance throughput of the loop by first coming up with a list schedule that can be divided into distinct fixed-length stages and then overlapping the execution of the stages belonging to consecutive loop iterations. FIG. 11D illustrates the division of the list schedule of FIG. 11C into three distinct, equal-length stages, named for convenience as A, B, C, with each stage representing 3 cycles worth of execution. A single loop iteration would therefore be comprised of a "software pipeline" consisting of three stages of execution, three cycles each.

Figure 11E:
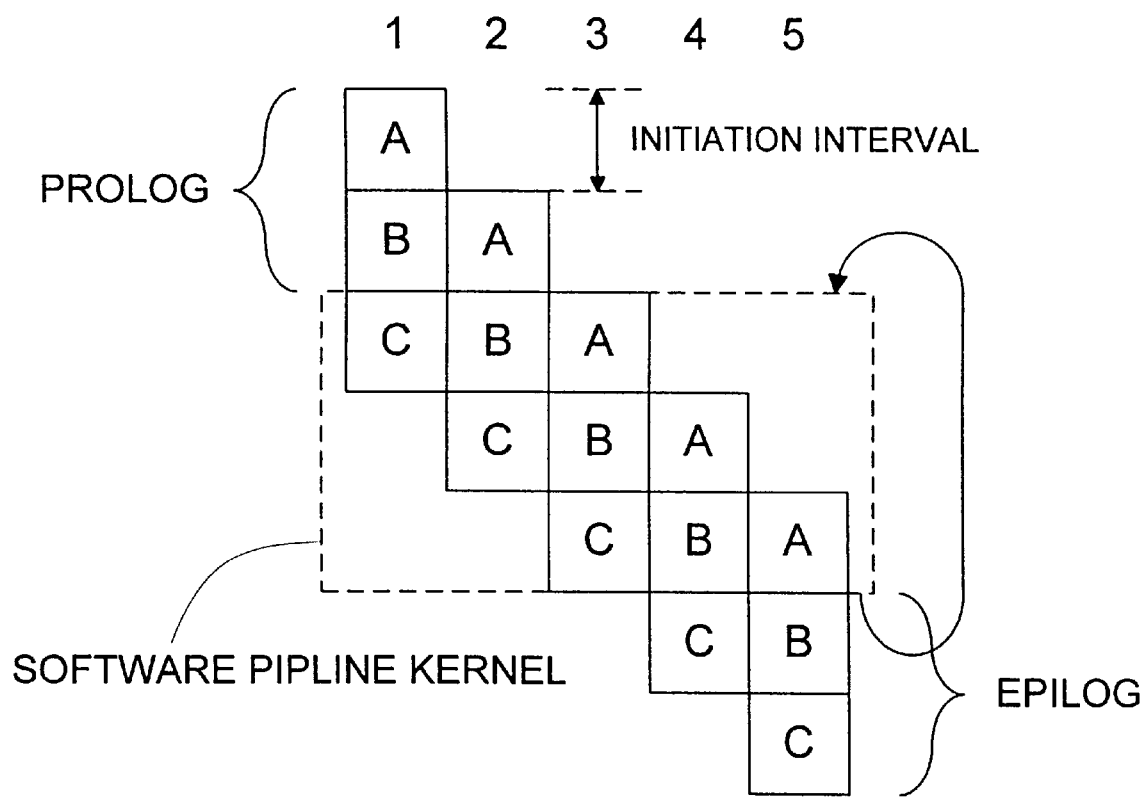
FIG. 11E illustrates the overlapped software pipeline schedule for the list schedule shown in FIG. 11C.

FIG. 11E illustrates how the software pipeline for consecutive loop iterations may be overlapped in time. Each loop iteration is staggered in time by one software pipeline stage. The delay in the start of execution of each consecutive loop iteration, which is exactly one software pipeline stage, is referred to as the loop "initiation interval" or "ii" for short. The ii for our example is three cycles. Note that a regular pattern emerges after we start the execution of three consecutive loop iterations. In particular, every stage of the software pipeline will be executed concurrently—one stage from each of the three loop iterations in flight.

This "steady-state" pattern of execution constitutes what's referred to as the software pipeline kernel, and is encompassed by the box shown in FIG. 11E. Note that instructions belonging to the software pipeline kernel may be executed repeatedly by branching back from the end of last set of overlapped pipeline stages of the kernel back to first set of overlapped stages of the kernel. The software pipeline kernel is exited when a sufficient number of loop iterations have been executed. The software pipeline stages executed prior to entering the kernel comprise the "prolog" of the software pipelined loop. The software pipeline stages that are executed after exiting the kernel comprise the "epilog" of the software pipeline kernel.

For our example, each iteration of the software pipeline kernel represents three iterations of execution of the original loop. While each original loop iteration still takes nine cycles, because a new loop iteration is started every ii cycles, the overall throughput of the loop is improved. In particular, the time taken to execute a software pipeline schedule is in general computed as:

$$\text{prolog\_length} + (\text{kernel\_length} * \text{kernel\_iteration count}) + \text{epilog\_length}. \quad \text{(Equation 1)}$$

For our example, since the kernel represents three iterations of the original loop, the kernel will be executed 10 times, accounting for 30 original loop iterations with the remaining two original loop iterations being executed as part of the prolog and epilog. The prolog and epilog are each two pipeline stages in length or six cycles each. Thus, instead of taking (9*32)=288 cycles to execute all the floating-point instructions of the original loop using the list schedule shown in FIG. 11C, the software-pipelined loop shown in FIG. 11E will take 6+(9*10)+6=102 cycles to execute, which represents almost a three-fold performance improvement.

Note that if post-increment synthesis is performed prior to software pipeline scheduling, it would not be possible to overlap the execution of consecutive loop iterations. For example, the FLOAD belonging to stage A of loop iteration 2 would not be able to execute before the FSTORE belonging to stage C of loop iteration 1. This is because the FLOAD would need to wait until the FSTORE post-increments its base register $R_p$ before it can use the post-incremented base register value to load the next array element value. In other words, we'd be constrained to execute each loop iteration sequentially using the list schedule shown in FIG. 11C.

Figure 11F:
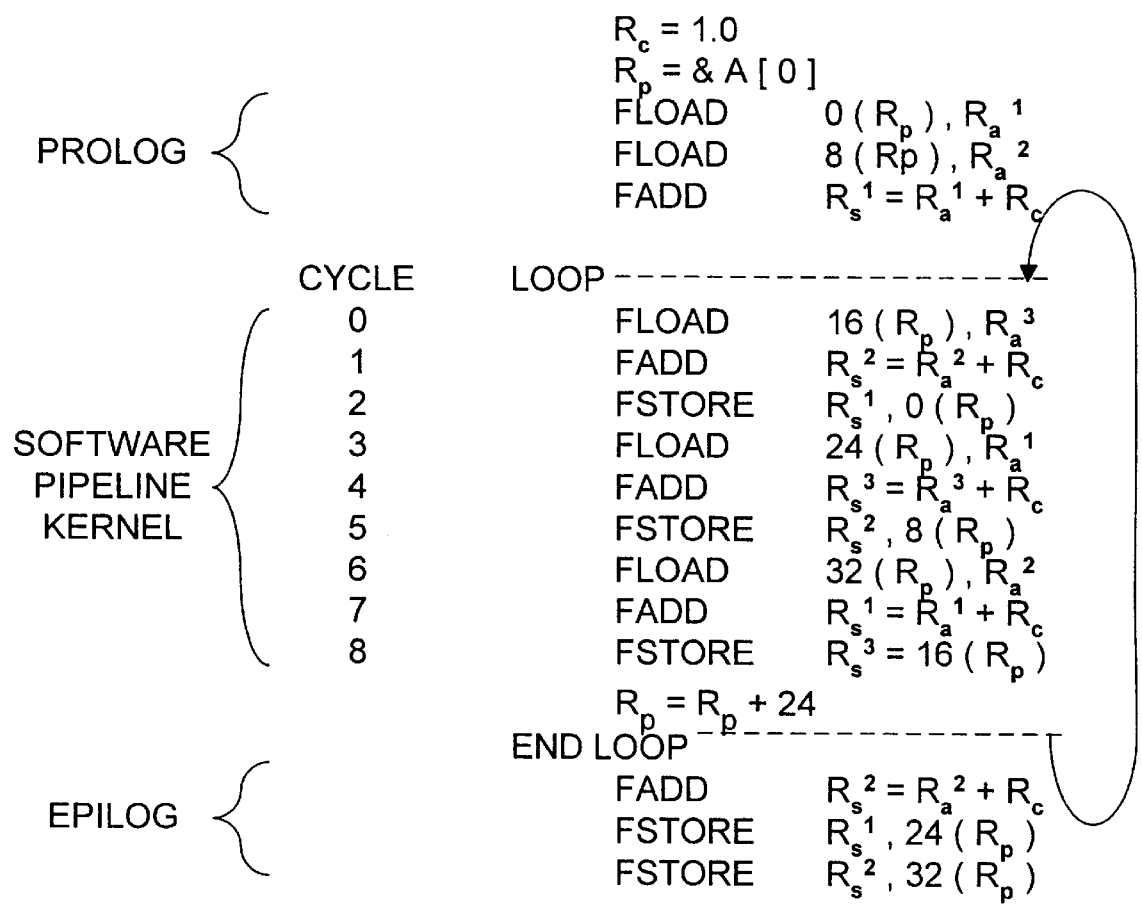
FIG. 11F shows the software pipeline schedule that would be obtained assuming the FLOAD and FSTORE instructions are transformed to use the (pseudo) (base+displacement) addressing mode.

FIG. 11F shows the software pipeline schedule that would be obtained assuming the FLOADs and FSTOREs are transformed to use the (pseudo) (base+displacement) addressing mode. Note that the common base register $R_p$ is incremented by the pseudo add instruction by 24 (representing 3× the original loop stride of 8). This pseudo add instruction is assumed by the software pipeliner to not consume any machine resources and thus does not affect the length of the software pipeline kernel.

Figure 11G:
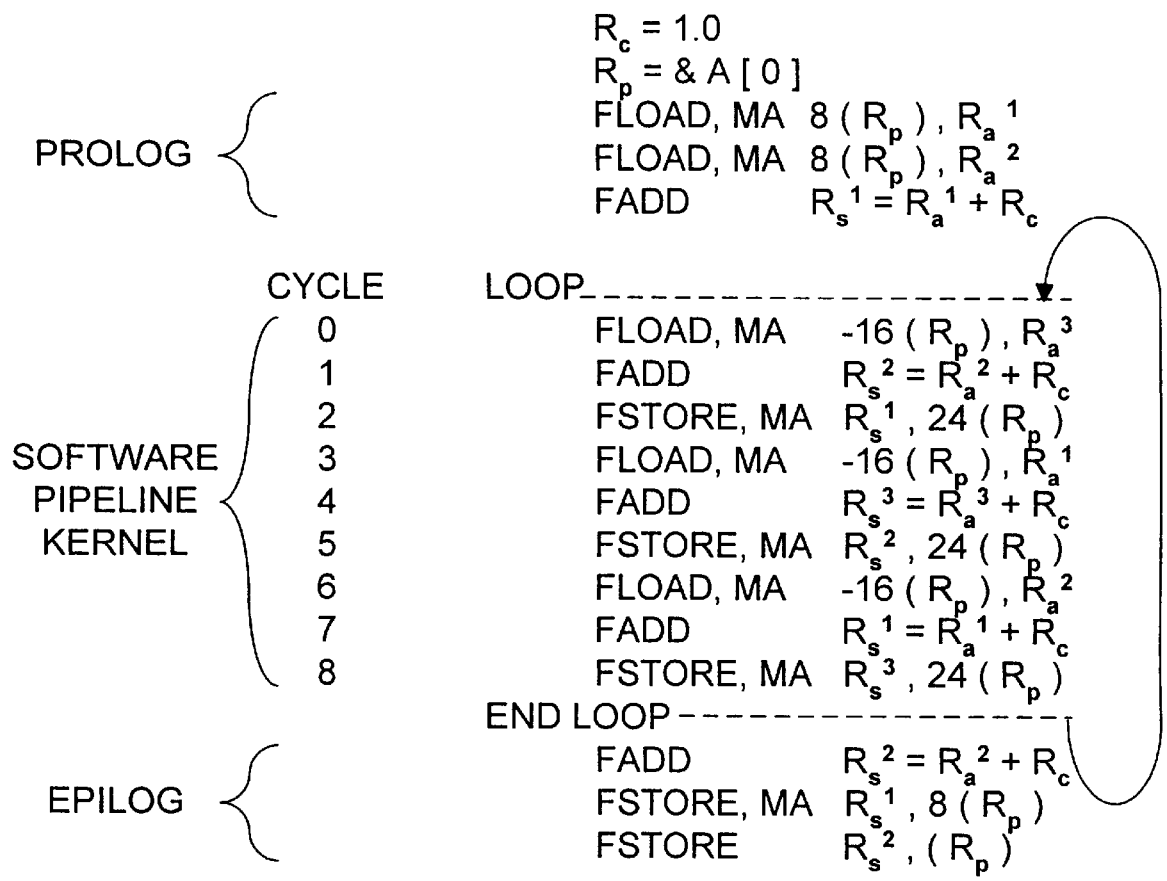
FIG. 11G shows the software pipeline schedule shown in FIG. 11F after post-increment synthesis.

FIG. 11G shows the software pipeline schedule shown in FIG. 11F after post-increment synthesis. Note that each memory access instruction in the software pipeline kernel has been transformed to post-increment its base register for a subsequent memory access operation.

Figure 11H:
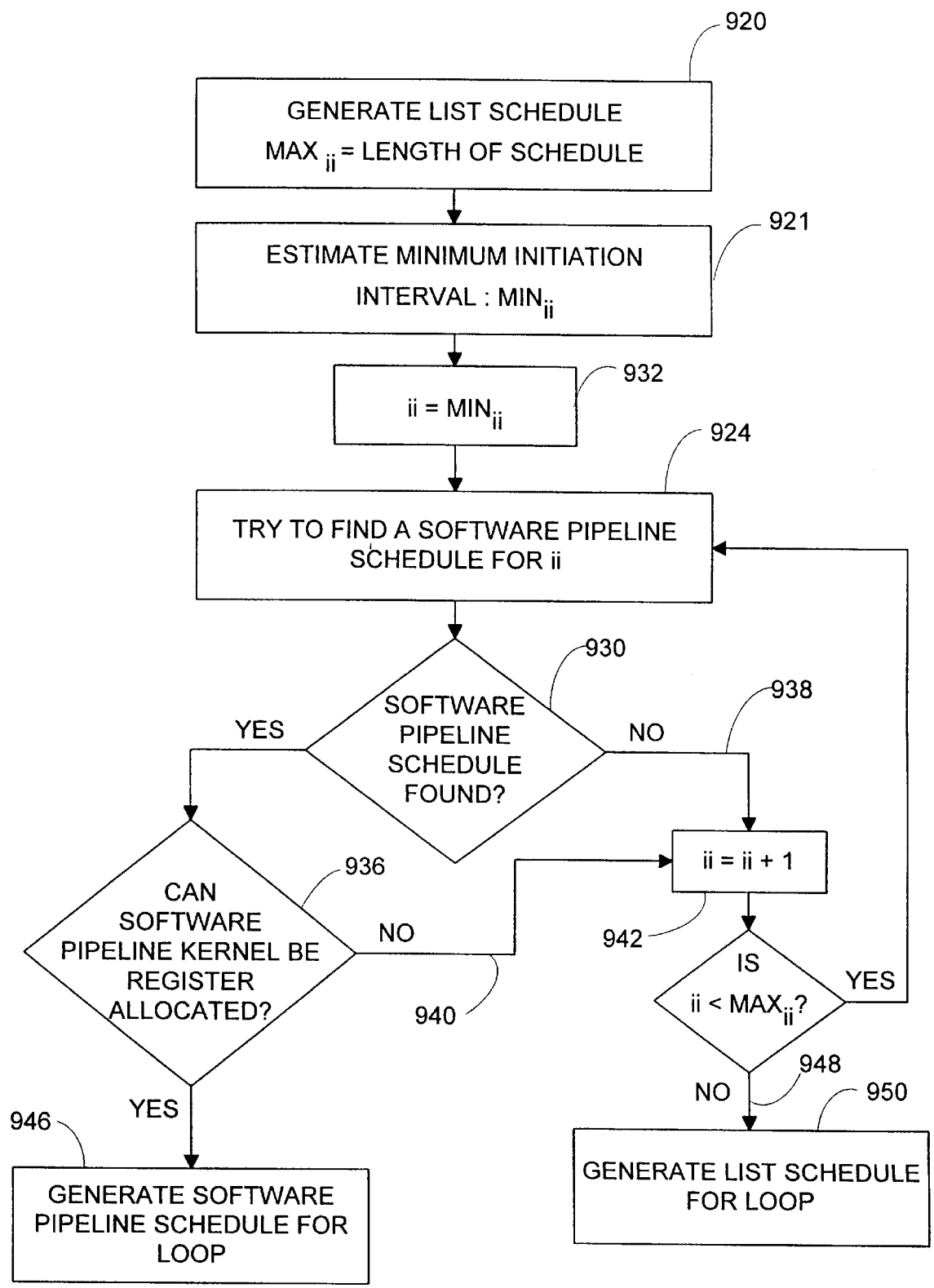
FIG. 11H shows a flowchart that depicts the logic that is traditionally used to generate a software pipeline schedule for a loop.

FIG. 11H shows a flowchart that depicts the logic that is traditionally used to generate a software pipeline schedule for a loop. First, a list schedule is generated to determine the upper bound on the initiation interval (MAXii) for a software pipeline schedule that would yield a performance improvement over an ordinary list schedule (step 920). (The run-time performance achieved by a software pipeline schedule with an ii greater than or equal to MAXii would not be better than that achieved by a list schedule.) Then a lower bound on the initiation interval (MINii) for the software pipeline schedule is estimated (step 921) using some heuristics. The software pipelining algorithm then attempts to find a legal software pipeline schedule (step 924) with an ii between MINii and MAXii, starting with an ii equal to MINii (step 932). After a software pipeline schedule is found for a particular ii, register allocation is attempted on the software pipeline kernel (step 936). If a software pipeline schedule is not found for an ii (938) or if register allocation fails at that ii (940), the ii is incremented by 1 (step 942) and a software pipeline schedule is sought at the higher ii value (step 924). This process repeats until a software pipeline schedule is found for an ii between MINii and MAXii for which register allocation is possible (without perturbing the schedule)(step 946). If no such schedule is found (948), then the normal list schedule (950)is generated for the loop in question instead of a software pipeline schedule.

Figure 11I:
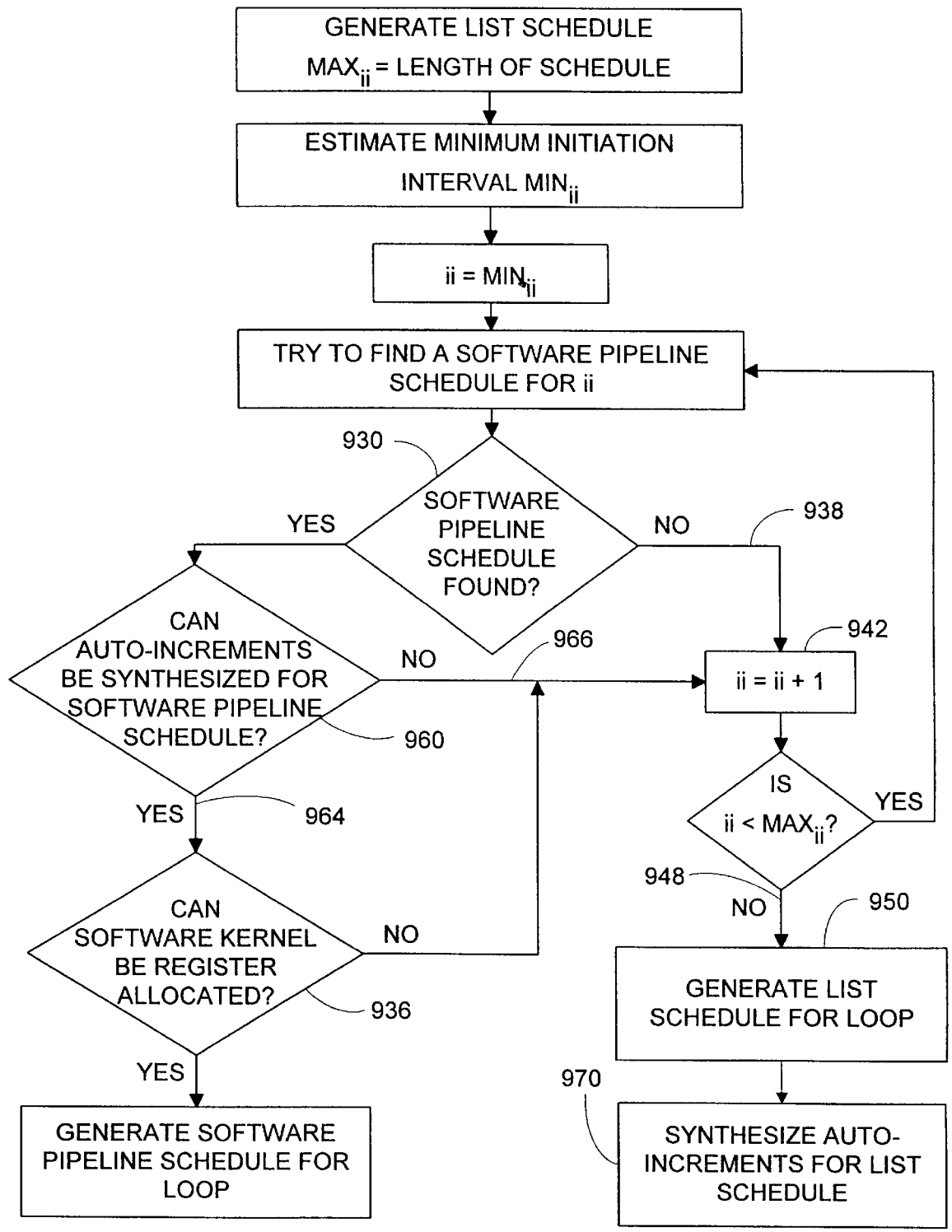
FIG. 11I shows a flowchart that depicts the logic used to generate a software pipeline schedule for a loop that incorporates the compiler algorithm of the present invention.

FIG. 11I shows how the flowchart of FIG. 11H is altered to accommodate post-increment synthesis. Note that after a software pipeline schedule is found for a particular ii value (step 930), post-increment synthesis is attempted (step 960) prior to register allocation. Only if post-increment synthesis succeeds (step 964) is register allocation attempted (step 936). Post-increment synthesis may fail (step 966) at a particular ii value if spill code (as described before) needs to be generated and the spill code cannot be accommodated in the software pipeline schedule that was found. Alternatively, post-increment synthesis may have had to clone base registers which may increase "register pressure" within the software pipeline schedule and cause register allocation to fail. In either case, the software pipeline schedule found at that ii is abandoned and a new software pipeline schedule at a higher ii value is sought. If no software pipeline schedule can be found for an ii between MINii and MAXii (948), the normal list schedule is generated for the loop (step 950) and post-increment synthesis (step 970) is performed on the list schedule as described earlier.

It is understood that the above description is intended to be illustrative and not restrictive. For example, typically applications and concepts described with respect to the post-increment or auto-incrementing mode addressing mode will also be applicable to the pre-increment addressing mode although some modifications to the algorithm may be needed. Similarly, applications and concepts described with respect to the pre-increment or auto-incrementing mode addressing mode will also be applicable to the post-increment addressing mode although some modifications to the algorithm may be needed. Further, although typically candidate memory instructions are transformed to the (base+displacement) addressing mode, in an alternative embodiment the candidate memory instructions are transformed to another addressing mode, such as an addressing mode not supported by the target architecture. The scope of the invention should be determined with reference to the appended claims, along with the full scope of equivalents to which such claims are entitled.

What is claimed is:

1. A compiler optimization algorithm including the steps of:
   (i) identifying candidate memory access instructions for auto-increment synthesis;
   (ii) transforming candidate memory access instructions into memory access instructions that employ an addressing mode not supported by the target architecture;
   (iii) scheduling the memory access instructions that are not supported by the target architecture; and
   (iv) transforming the memory access instructions that are not supported by the target architecture into an auto-increment memory access instructions.

2. A compiler optimization algorithm for optimizing a low-level representation of a program for a target architecture that supports an auto-increment addressing mode, including the steps of:
   identifying candidate memory access instructions for auto-increment synthesis;
   transforming candidate memory access instructions into pseudo base+displacement memory access instructions, wherein the step of transforming candidate memory access instruction into pseudo base+displacement memory access instructions occurs prior to the step of instruction scheduling;
   scheduling the pseudo base+displacement memory instructions; and
   converting the pseudo base+displacement memory access instructions into memory access instructions that auto-increment their base register operands, wherein the step of converting the base+displacement memory access instructions into memory access instructions that auto-increment their base operands is performed after instruction scheduling.

3. The method recited in claim 2 wherein the candidates are memory access instructions that occur in loops which specify an address that is a linear function of a loop induction variable.

4. The method recited in claim 2 further including the step of generating a list schedule for a loop to determine a maximum initiation interval ($MAX_{ii}$), estimating the minimum initiation interval ($MIN_{ii}$) and attempting to find a software pipeline schedule.

5. The method recited in claim 4 wherein if the software pipeline schedule is not found for a $MIN_{ii}$ less than $MAX_{ii}$, the minimum initiation interval is incremented.

6. The method recited in claim 4 wherein if the software pipeline schedule is not found and $MIN_{ii}$ is greater than $MAX_{ii}$, the list schedule for the loop is generated and auto-increments for the list schedule are synthesized.

7. The method recited in claim 4 further including the step of determining whether auto-increments can be synthesized for the software pipeline schedule when the software pipeline schedule is found for a $MIN_{ii}$ less than $MAX_{ii}$.

8. The method recited in claim 7 further including the step of determining whether the software pipeline kernel can be register allocated when auto-increments can be synthesized for the software pipeline schedule.

9. The method recited in claim 8 further including the step of generating a software pipeline schedule when it is determined that the software pipeline kernel can be register allocated.

10. The method recited in claim 2 where the base+displacement addressing mode is not supported by the target architecture.

11. The method recited in claim 10 wherein all of the candidate memory instructions are converted to base+displacement instructions before scheduling.

12. The method recited in claim 2 where the base+displacement addressing mode is supported by the target architecture.

13. The method recited in claim 12 wherein all of the candidate memory instructions are converted to base+displacement instructions before scheduling.

14. A compiler optimization algorithm for optimizing a low-level representation of a program for a target architecture that supports an auto-increment addressing mode, including the steps of:
  identifying candidate memory access instructions for auto-increment synthesis;
  transforming candidate memory access instructions into pseudo base+displacement memory access instructions; and
  converting the pseudo base+displacement memory access instructions into memory access instructions that auto-increment their base resister operands, wherein the pseudo base+displacement memory access instructions are converted into memory access instructions that post-increment their base register operands, further including the step of determining whether the same base register is used by multiple memory access instruction scheduled in the same cycle.

15. The method recited in claim 14 wherein if the same base register is not used by at least two memory access instructions scheduled in the same cycle, upstream memory access instructions are transformed to post-increment their base register operands on behalf of the memory access instructions in that cycle.

16. The method recited in claim 14 further including the step of determining whether upstream memory access instructions can post-increment their base registers on behalf of downstream memory access instructions when the same base register is not used by multiple memory access instructions scheduled in the same cycle.

17. The method recited in claim 16 further including the step of transforming an upstream memory access instruction into a memory access instruction that post-increments its base register operand on behalf of a downstream memory access instruction when it is determined that the upstream memory access instruction can be post-increment its base register operand on behalf of the downstream memory access instruction.

18. The method recited in claim 17 further including the step of converting the downstream memory access instruction to use the appropriate base register.

19. The method recited in claim 14 further including the step of determining whether base register cloning is more efficient than inserting spill code.

20. The method recited in claim 19 further including the step of inserting spill code on behalf of a memory access instruction when it is determined that inserting spill code is more efficient than cloning a base register.

21. The method recited in claim 20 further including the step of converting the memory access instruction to use the appropriate base register.

22. The method recited in claim 19 further including the step of cloning the base register when it is determined that cloning the base register is more efficient than inserting spill code.

23. The method recited in claim 22 further including the step of converting the memory access instruction to use the appropriate base register.

* * * * *